Nov. 27, 1951     R. R. CAUBLE     2,576,500
TRASH CUTTING ATTACHMENT FOR BREAKING PLOWS
Filed Jan. 10, 1946     2 SHEETS—SHEET 1
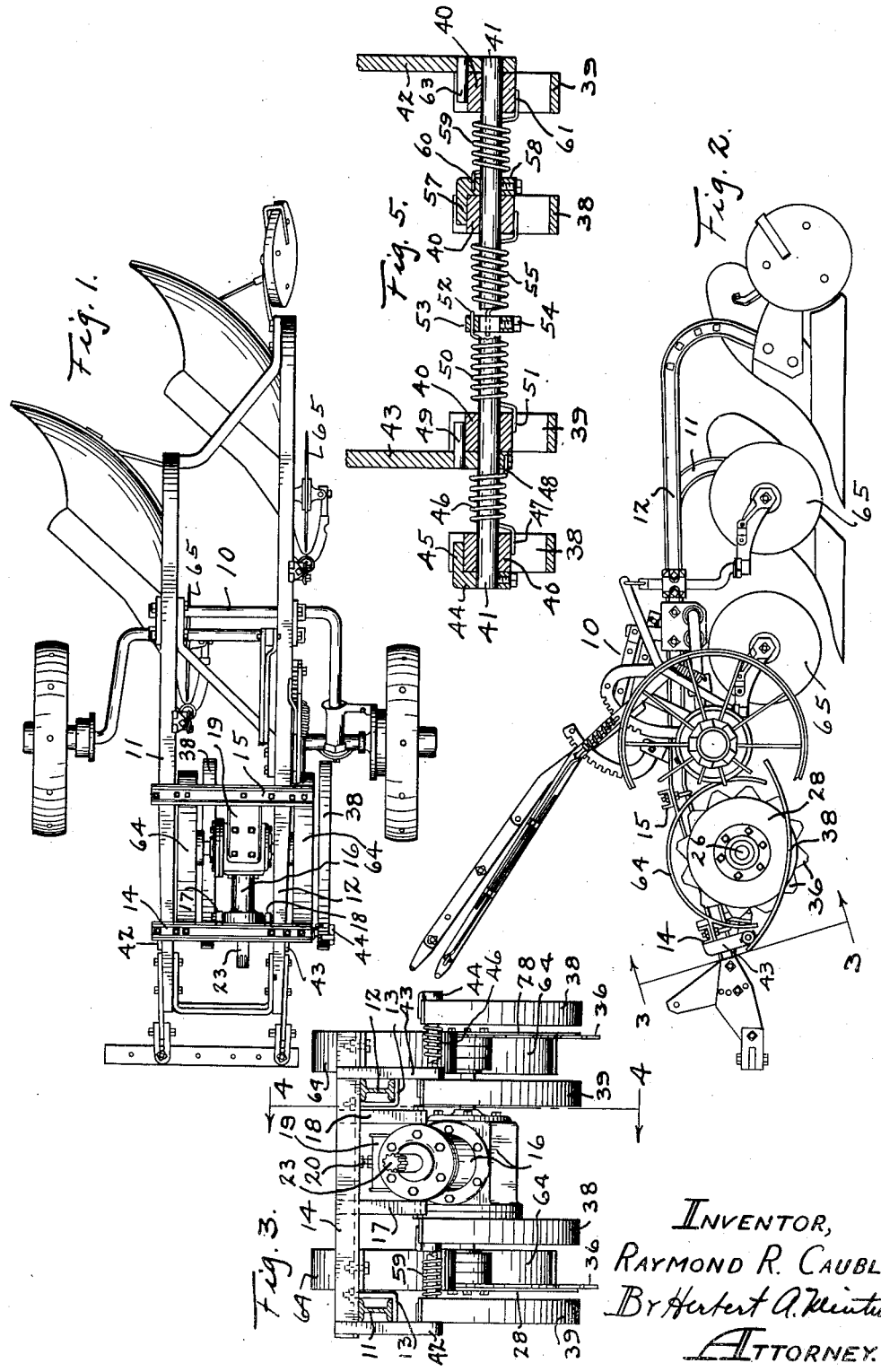
INVENTOR,
RAYMOND R. CAUBLE,
By Herbert A. Minturn
ATTORNEY.

Nov. 27, 1951 R. R. CAUBLE 2,576,500
TRASH CUTTING ATTACHMENT FOR BREAKING PLOWS
Filed Jan. 10, 1946 2 SHEETS—SHEET 2
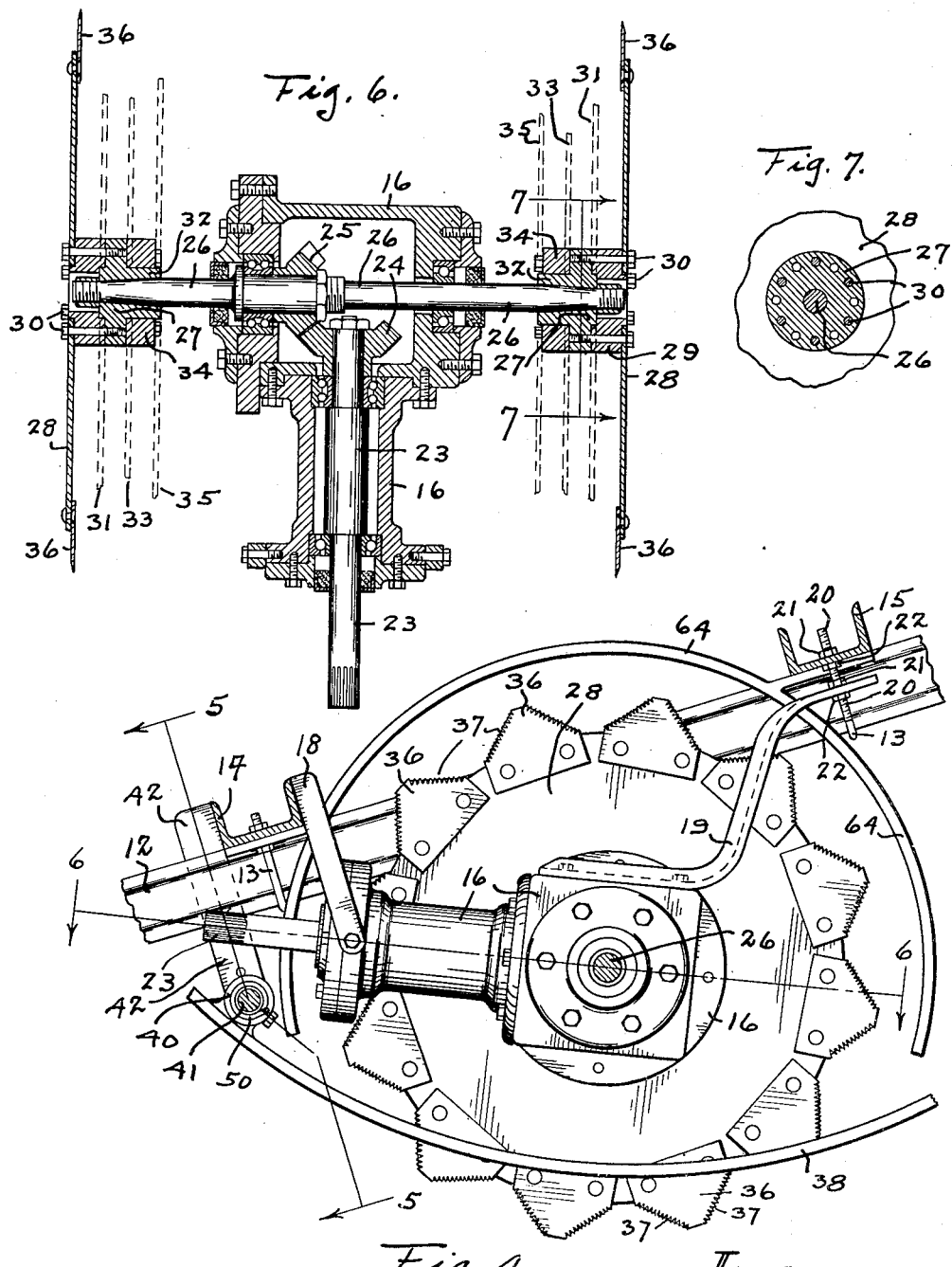
INVENTOR,
RAYMOND R. CAUBLE,
By Herbert A. Minturn,
ATTORNEY.

Patented Nov. 27, 1951

2,576,500

UNITED STATES PATENT OFFICE 2,576,500

TRASH CUTTING ATTACHMENT FOR BREAKING PLOWS

Raymond R. Cauble, Indianapolis, Ind.

Application January 10, 1946, Serial No. 640,215

2 Claims. (Cl. 97—40)

This invention relates to an attachment for breaking plows for cutting through trash, such as soy bean vines, sweet clover, corn stocks and the like, in line substantially with the edge of a furrow whereby the trash may be completely turned under by the following plow.

I am aware of the fact that heretofore the rolling cutters have been employed in an attempt to slice through such trash as above suggested, but these devices have been unsatisfactory particularly where the trash is quite heavy or is encountered in bunches as frequently happens behind a combine. The present invention contemplates the use of a cutter ahead of each plow and some means for driving the cutter to have its peripheral speed greater than that of the ground speed of the plow whereby the trash may be cut irrespective of plow speed. Furthermore the invention embodies means for pressing the trash against the ground while being cut so that the trash is not kicked up and back over the plow or disturbed in any manner other than by having a cut made directly therethrough.

Other important features and advantages, are found in the adaptability of the structure embodying the invention to be applied to various plow structures and also in the unique combination of the various elements as set forth in the appended claims. One particular form of the invention is illustrated in the accompanying drawings, in which Fig. 1 is a view in top plan of a two bottom plow to which the invention is applied;

Fig. 2, a view in side elevation;

Fig. 3, a view on an enlarged scale in section on a line 3—3 in Fig. 2;

Fig. 4, a view on a still further enlarged scale in vertical section on a line 4—4 in Fig. 3;

Fig. 5, a view in section on a line 5—5 in Fig. 4;

Fig. 6, a view in section on a line 6—6 in Fig. 4;

Fig. 7, a view in section on a line 7—7 in Fig. 6.

Like characters of reference indicate like parts throughout the several views in the drawings.

The plow generally designated by the numeral 10 is herein illustrated as being a two bottom plow, tractor drawn. In this type of plow there are two beams 11 and 12, spaced apart in the usual manner, one for each of the plows. Across the beams 11 and 12 toward their front ends I attach thereto in any suitable manner, such as by U bolts 13 the channel irons 14 and 15 spaced apart one from the other. In the particular form of the invention herein illustrated, these channel irons 14 and 15 carry the mechanism employed to perform the trash cutting operation.

Suspended from these channel irons 14 and 15, is a built-up housing generally designated by the numeral 16. The forward end of the housing 16 is carried in a vertically rockable manner between the brackets 17 and 18 which are fixed by their upper ends to the channel iron 14. The rear end of the housing 16 is adjustably supported from the channel iron 15 in any suitable manner, herein shown as by a bracket 19, the forward portion of which is bolted to the top side of the housing 16 to extend upwardly and rearwardly therefrom to terminate under the channel iron 15. A bolt 20 extends from the channel iron 15 downwardly through the rear end of the bracket 19 and carries nuts 21 and 22 thereon as a means for adjustably raising or lowering the bracket 19 so as to tilt the housing 16 as may be desired.

Referring primarily to Fig. 6 this housing 16 carries a drive shaft 23 to extend longitudinally thereof and project therefrom to be connected with any suitable power source, such as the power take off of the plow pulling tractor (not shown), to which the shaft 23 may be connected by any one of the well-known manners such as through a shaft and universal joints. On the rear end of the shaft 23 within the housing 16 is fixed a gear 24 which is in constant mesh with a gear 25 fixed on a transverse shaft 26. In the present form, these gears 24 and 25 are bevel gears. The shaft 26 extends by both ends from the sides of the housing 16.

On each end of the shaft 26 is fixed a hub 27. In order to make the invention applicable to different widths of plows, such for example as 12", 14", 16", and 18" plows, it is desirable to provide means in conjunction with the drive hub 27 to space the cutting disc 28 in accordance with the particular width of plow encountered. As shown by the solid lines in Fig. 6, the disc 28 is mounted in conjunction with the hub 27 for the widest plow, the 18" plow. To provide for this spacing, a collar 29 is fitted against the outer face of the hub 27 and then the disc 28 is applied against the outer face of the collar 29 and there secured by means of a plurality of bolts 30 which extend in a circular row through the disc 28, the collar 29, and screw-threadedly engaged in the hub 27. Then, for the 16" plow width, the collar 29 is dispensed with and a disc 28 is mounted directly against the outer face of the collar 27 to be in a position indicated by the dash lines carrying the numeral 31. The disc 28 is provided with a central hole therethrough, and for the 14" spacing, the hub 27 is removed from the shaft 26 to have a reduced diameter, inner sleeve 32 inserted through the disc 28, and the hub 27 returned to its position on the shaft 26 to have the disc 28 then carried in the position indicated by the dash lines carrying the numeral 33. For the 12" plow width, a collar 34 is mounted on the hub 27 around the sleeve 32 and the disc 28 fitted against the inner face of this collar 34 to position the cutting disc 28 in the dash line position indicated by the numeral 35.

The disc 28 above referred to is preferably made to have cutting members around its periphery. In the present form of the invention, individual sections 36 are mounted around the marginal portion of the disc 28 to extend therefrom. Each of the sections 36 in the present form constitutes a standard mower or binder section and has serrated edges 37 to facilitate the cutting action. The disc 28 is driven in a counter-clockwise direction as viewed in Figs. 2 and 4.

The overall diameter of the disc 28 and its attached sections 36 is made to be such that when the plows are in their working positions within the soil, the extreme outer ends of the sections 36, through suitable adjustment between the bracket 19 and the channel member 15 will clear the surface of the soil without digging or cutting therein, and yet will cut through the trash encountered. This clearance will be variable depending upon the degree of dryness of the trash, speed of operation of the plow and the plowing depth.

Now to facilitate the cutting action by the section numbers 36, the invention includes a pair of yielding presser feet 38 and 39 for each of the discs 28. The disc 28 in each instance is mounted between these feet. Each foot 38 and 39 consists essentially of a curved leaf spring member and carries a head 40 on its forward upper side through which is received a cross shaft 41 to permit the head 40 to be rockably carried thereby.

Referring particularly to Figs. 3 and 5, the shaft 41 is supported from the channel iron 14 by the two arms 42 and 43. On the outer left hand end of the shaft 41 is fixed thereto a collar 44 which carries an inturned finger 45 to be in the path of the upper front end of the foot 38 to serve as a stop limiting the downward rocking of the portion of the foot 38 behind the shaft 41. A torsion spring 46 surrounds the shaft 41 to have an end 47 bear against the foot 38 back of the shaft 41 and its other end 48 secured to the arm 43. The spring 46 tends to urge the foot 38 downwardly by its rear major portion to bring the front end against the stop finger 45. When an unusually large pile of trash is encountered, or some obstruction appears, the foot 38 may yieldingly lift to slide thereover against the resistance of the spring 46. This spring 46 also serves to space the foot 38 outwardly from the arm 43 into sliding contact with the outer retaining collar 44.

The foot 39, on the other side of the disc 28, is normally held to extend rearwardly at the same elevation as the foot 38 by reason of pin 49 carried by the arm 43 extending across the forward upper side of the foot 39. To yieldingly retain the foot 39 in that position, a torsion spring 50 is carried on the shaft 41 to have one end 51 thereof bear against the top side of the foot 39 back of the head 40 thereon. The other end 52 of the torsion spring 50 engages a collar 53 that is secured to the shaft 41 in any suitable manner, such as by the set screw 54. The torsion spring 50 also serves as a spacer to retain the head 40 of the foot 39 in sliding contact with the lower end of the supporting arm 43.

Continuing to the right along the shaft 41, is a torsion spring 55 having one end engaged with a collar 53 and its other end behind and below the head 40 fixed on the next adjacent foot 38, tending to yieldingly hold that foot down to the same level as that of the other two feet, this position being determined by the finger 57 positioned in the path of the upper forward end of that foot 38. This finger 57 is an integral part of the collar 58 that is secured to the shaft 41 and serves as a bearing against which the foot head 40 may rock by reason of the spacing thereagainst by the spring 55.

A torsion spring 59 has an end 60 engaged in the collar 58 and its other end 61 back of and below the head 40 of the right hand foot 39 yieldingly retaining that foot 39 at the same elevation as that of the other three feet, by reason of the forward upper end of the right hand foot 39 abutting the pin 63 that projects from the arm 42. The spring 59 also serves to retain the right hand foot 39 in sliding contact with the lower end of the arm 42.

Preferably a guard 64 is mounted in any suitable manner, here shown as between the channel irons 14 and 15 to be immediately above the cutting disc 28 in each instance. The guard 64 is made to have sufficient width so as to be over the disc 28 in any one of its four permissible positions.

In operation, the discs 28 are set in motion to revolve at the speed required to slice through the encountered trash without tendency to drag the trash. The feet 38 and 39 serve to hold the trash against the dragging action while the disc 28 and those cutting sections 36 slice between those feet in each instance to obtain a shear. The disc 28 is preferably located in each instance to be substantially in line with the rolling colter 65 so that when the furrow cut starts to roll over under the action of the plow, the trash will have to be cut along the plane of the slice defining the furrow edge, and the trash thus be carried on over to be covered by the turned over soil.

While the invention has herein been shown and described in the one particular form, it is obvious that many structural changes may be employed particularly in the mounting of the cutting discs and their driving mechanisms as well as in the precise mounting of the presser feet, all without departing from the spirit of the invention, and I therefore do not desire to be limited to that precise form beyond the limitations as may be imposed by the following claims.

I claim:

1. An attachment for a tractor drawn breaking plow, for mounting ahead of rolling colters thereon, comprising a housing; a transverse shaft therethrough extending therefrom by both ends; a drive shaft to be driven by said tractor, entering the housing at substantially right angles thereto; driving means within the housing between said two shafts; a member carried by the plow supporting said housing; a head carried on each of said transverse shaft ends; a plurality of seats on each head; a disc selectively secured on one of said seats on each of said heads; said discs each having a peripheral serrated cutting edge; and a vertically yieldable, trash presser foot on each side of each of said discs, between which feet, trash is sheared by said disc cutting edges; said housing being located to position said discs ahead of and substantially in line with said colters.

2. An attachment for a tractor drawn breaking plow, for mounting ahead of rolling colters thereon, comprising a housing; a transverse shaft therethrough extending therefrom by both ends; a drive shaft to be driven by said tractor, entering the housing at substantially right angles thereto; driving means within the housing between said two shafts; a disc secured on the outer ends of said transverse shaft; said discs each having a peripheral serrated cutting edge; a vertically yieldable, trash presser foot on each side of each of said discs, between which feet trash is sheared by said disc cutting edges; said housing being located to position said discs ahead of and substantially in line with said colters; and a mounting member supporting said housing from said plow for selected positioning of said discs relative to the ground to hold the discs out of contact with the ground.

RAYMOND R. CAUBLE.

REFERENCES CITED

The following references are of record in the file of this patent:

UNITED STATES PATENTS

| Number | Name | Date |
|---|---|---|
| 1,520,741 | Adamy | Dec. 30, 1924 |
| 1,795,182 | Ross | Mar. 3, 1931 |
| 2,052,114 | Sanders | Aug. 25, 1936 |
| 2,280,107 | Stute | Apr. 21, 1942 |
| 2,287,479 | Kelsey | June 23, 1942 |
| 2,465,488 | Sears et al. | Mar. 29, 1949 |